United States Patent [19]

Zielinski

[11] 4,421,953

[45] Dec. 20, 1983

[54] TELEPHONE TACTILE ALERT SYSTEM

[75] Inventor: Lech S. Zielinski, Ottawa, Canada

[73] Assignee: Northern Telecom Limited, Montreal, Canada

[21] Appl. No.: 327,799

[22] Filed: Dec. 7, 1981

[51] Int. Cl.³ .......................................... H04M 11/00
[52] U.S. Cl. ............................ 179/2 EC; 340/825.46
[58] Field of Search ................ 179/2 E, 2 EA, 2 EB, 179/2 DP, 2 EC, 84 R; 340/407, 311, 312, 148, 311.1, 825.46

[56] References Cited

U.S. PATENT DOCUMENTS

| 3,623,064 | 11/1971 | Kagan | 340/407 X |
| 3,811,012 | 5/1974 | Barber | 179/2 EA X |
| 4,066,848 | 1/1978 | Darwood | 179/84 R |
| 4,225,965 | 9/1980 | Baugh | 340/407 X |
| 4,297,677 | 10/1981 | Lewis et al. | 340/407 X |
| 4,307,266 | 12/1981 | Messina | 179/2 DP |

Primary Examiner—A. D. Pellinen
Assistant Examiner—W. J. Brady
Attorney, Agent, or Firm—Stuart L. Wilkinson

[57] ABSTRACT

A telephone user who cannot hear the telephone ringing is alerted, other than audibly, to the fact that the telephone must be answered. A radio transmitter at the telephone is driven by ringing voltage supplied to the instrument. The transmitter emits a radio signal which is picked up by a receiver carried by the telephone user. Upon detection of the received signal, a tactile transducer is actuated and alerts the telephone user to the fact that the telephone must be answered.

11 Claims, 4 Drawing Figures

TELEPHONE TACTILE ALERT SYSTEM

This invention relates to a system for alerting a telephone user who cannot hear the telephone ringing, that the telephone should be answered.

Quite often, and for a variety of reasons, a ringing telephone will not be heard. The telephone user may be deaf. The bell volume may be deliberately turned down, perhaps in consideration of someone else sleeping on the premises. There may be the noise of a vacuum cleaner, radio, television or gramaphone record which drowns the sound of the ringing telephone. Lastly, the telephone user may be in the garden or garage or otherwise remote from the telephone set and so too far away to hear the ringing.

In such circumstances, a system for alterting the telephone user would be convenient.

According to the invention, there is provided a system for alterting a telephone user when the telephone is being energized by ringing voltage, the device comprising a telephone unit including a transmitter having an output which is controlled by ringing voltage on the telephone line, and a user unit including a receiver for receiving a signal from the transmitter, and a transducer under the control of the receiver for converting the received signal into a signal which is non-audibly sensible by the telephone user.

Preferably, the transducer is actuated to produce a physical vibration. The transducer can be mounted within a housing worn by the telephone user whereby to give a tactile response. The housing can, for example, be wrist worn. The user unit preferably includes a detector to detect a predetermined frequency of signal received by the receiver, the detector operably coupled to a low-power battery-driven motor circuit. The transmitter is preferably mains driven, ringing voltage from the telephone line being applied to the transmitter through an optical isolator whereby to prevent mains voltage and system noise from appearing on the telephone line.

An embodiment of the invention will now be described by way of example with reference to the accompanying drawings in which.

Figure 1:
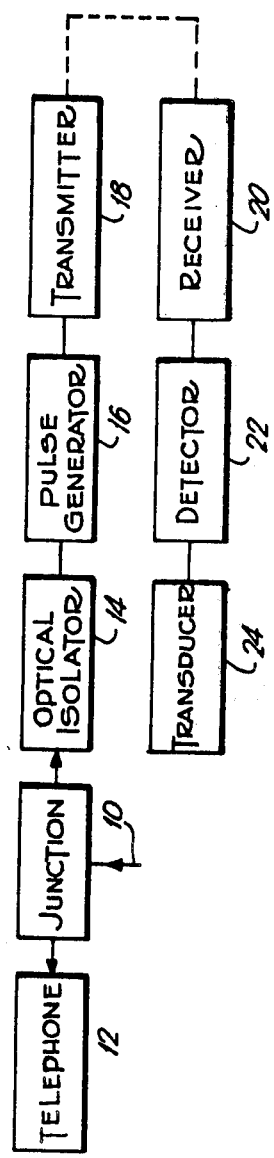
FIG. 1 is a block schematic diagram of an alerting system according to the invention.

Referring in detail to the block schematic diagram of FIG. 1, there is shown a telephone tactile alert system. Ringing voltage from a telephone line 10 is applied both to a telephone set 12, and, through an optical isolator 14, to a pulse generator 16 which controls the output of a radio transmitter 18. While ringing voltage is present on the telephone line, the transmitter 18 emits a radio frequency signal which is picked up by a receiver 20. A detector 22 monitors the received signal and, in response to a selected frequency component above a preset threshold level, actuates a transducer 24 which converts the received signal to a physical vibration. The vibration elicits a tactile response in a user wearing the receiver unit.

Figure 2:
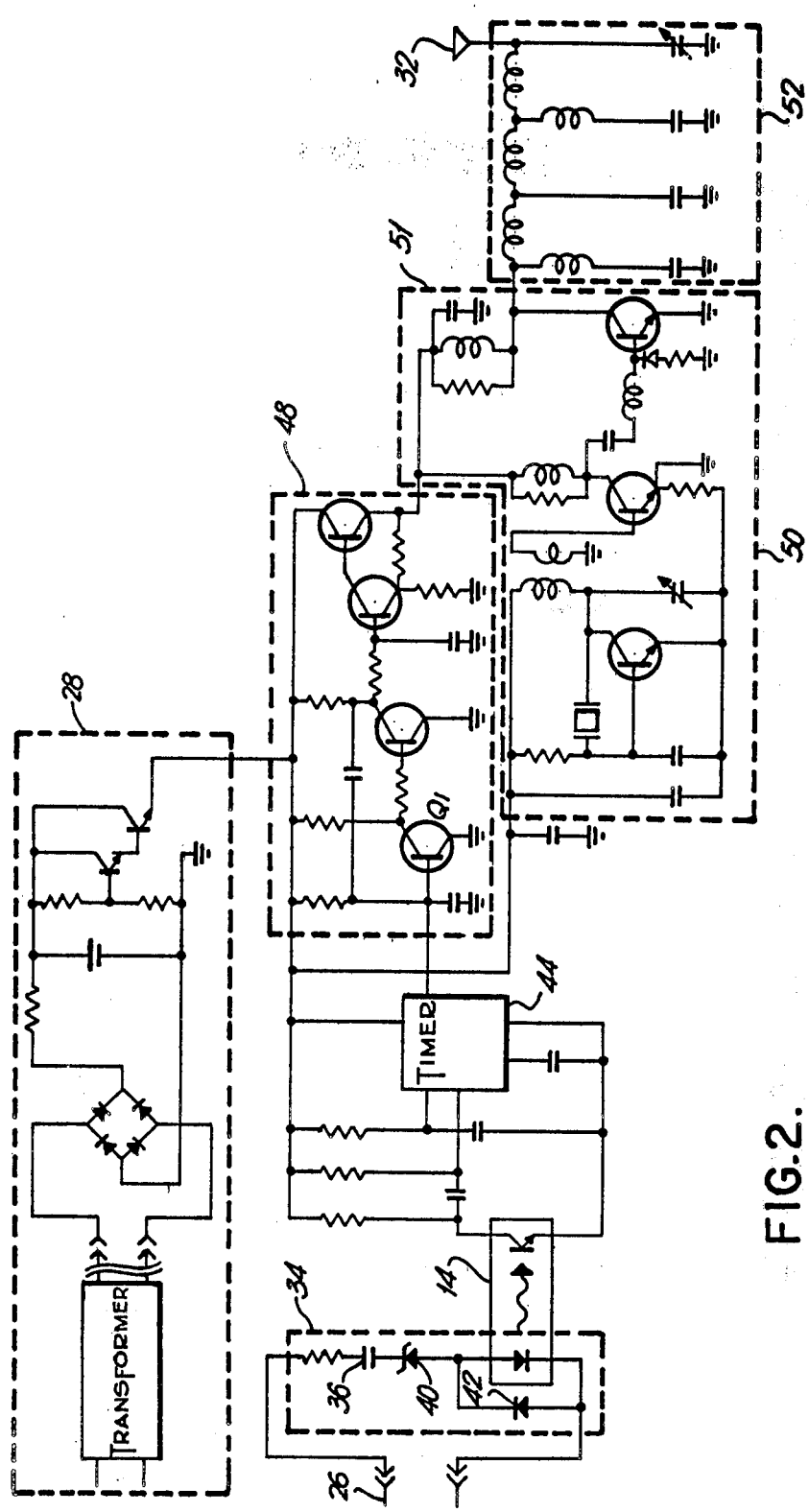
FIG. 2 is a detailed circuit representation of a transmitter unit forming part of the system of FIG. 1.

Referring now to FIG. 2, the transmitter unit has a plug 26, which mates with one socket of a standard double socket wall mounted junction unit which is connected to the telephone line. The other socket is engaged by a plug electrically connected to the telephone set.

A 0.7 V output generated at a voltage tap 34 is directed to the optical isolator 14 when ringing voltage is present. The voltage tap includes a capacitor 36 to prevent operation in response to DC and low voltage signals. A zener diode 40 conducts when ringing voltage (80 V RMS), is present; a further diode 42 is incorporated for protection.

The optical isolator is a standard unit incorporating a light emitting diode and a PIN photodiode. The output from the optical isolator is taken to a timer 44 (IC7555), which produces DC pulses with a 4 second-2 second mark-space duty cycle, pulse initiation corresponding to the start of ringing voltage pulses. DC power generated in network 28 is derived from mains AC.

The output from the timer 44 is directed to the base of a transistor Q1 forming the first stage of a multi-stage transmitter amplifier 48. The amplifier output enables a local oscillator circuit 51 which generates a carrier signal at a crystal controlled frequency of 53.1 MHz. The keyed carrier signal is directed to a short wire antenna 32 through a filter circuit 52.

Figure 3:
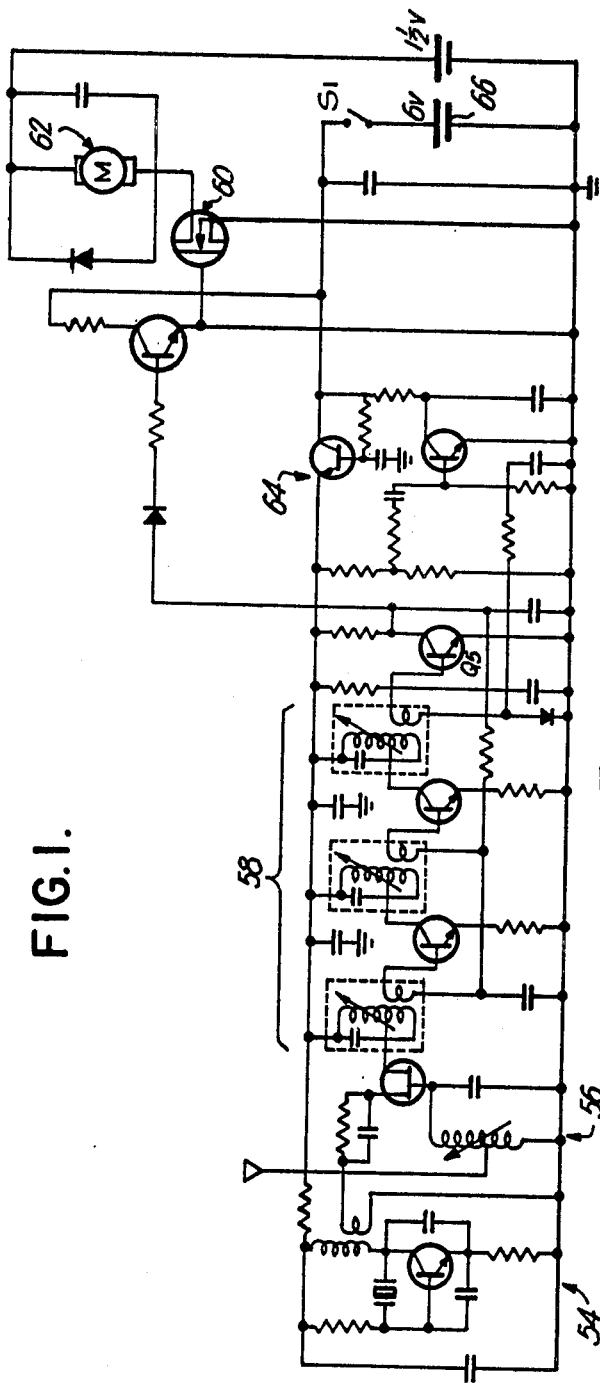
FIG. 3 is a detailed circuit representation of a receiver unit forming part of the system of FIG. 1.

Referring in detail to FIG. 3, the receiver includes a crystal controlled local oscillator 54 at a frequency of 53.55 MHz. At a mixing circuit 56 the locally generated frequency is mixed with the incoming carrier frequency to generate an intermediate frequency of 450 KHz. The intermediate frequency signal is amplified at a multi-stage amplifier 58, the output from which is rectified at transistor Q5. The DC output is taken to a threshold detection network including a low-power consuming VMOS switch 60. The switch, when actuated, directs current to a micromotor 62. One example of a suitable motor which operates from a nominal supply of 1½ V and draws about 30 mA current can be obtained from ESCAP Inc. under the specification No. 712 L81 10S. An output shaft of the micromotor 62 is fitted with an eccentric weight (not shown) which causes the motor body to vibrate when the motor is energized. The network 64 functions essentially as a voltage regulator. A 6 V battery supply 66 supplies power to the receiver and detector.

Figure 4:
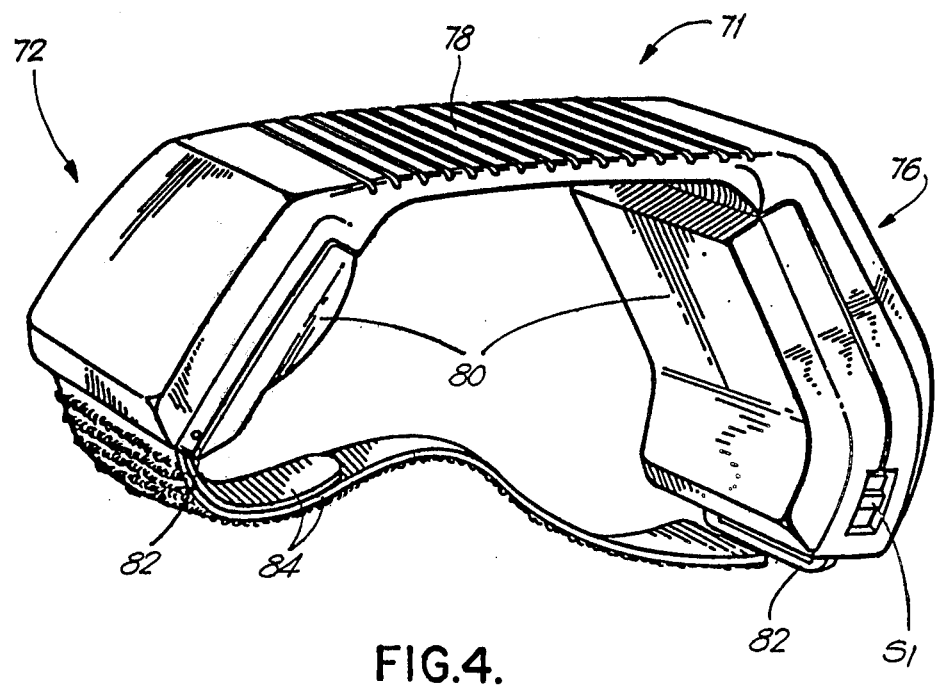
FIG. 4 shows a wrist mounted housing for the FIG. 3 circuit.

Referring to FIG. 4, the motor and the 1½ V battery are taped together and friction fitted into one compartment 72 of a moulded plastic bracelet 71. A tactile sensation is induced in the wearer's wrist by vibration of the motor body against a compartment wall. The 6 V battery together with the receiver and detector circuits are housed within a second compartment 76 of the bracelet. The bracelet has a web portion 78 offering rudimentary flexibility, the web portion extending between the compartments 72 and 76. Covers 80 adapted to close the compartments can be press fitted against the moulded bracelet, the covers and the moulding having cooperating ribs and recesses (not shown). Attached to lugs 82 formed at each of the compartments 72 and 76 are Velcro (Registered Trademark) strips 84 by means of which the bracelet incorporating the receiver unit can be secured around the user's wrist.

As previously indicated, in operation the ringing voltage actuates both the telephone set bell and the radio transmitter to emit radio frequency bursts corresponding approximately in length to the length of ringing voltage bursts. If a switch S1 shown in FIGS. 3 and 4 is placed in the "ON" position, then the receiver unit receives the radio signal and produces corresponding vibration of the micromotor against the wall of the bracelet. This produces a tactile response in the user who is thereby alerted that the telephone must be answered. Upon picking up the telephone handset, ringing voltage ceases as does vibration of the micromotor 62.

Although the invention has been described in terms of a radio signal transmitted from a transmitter unit located adjacent to the telephone set, the transmitter output being modulated by ringing voltage, other types of transmitter and receiver could be used. Thus the transmitter and receiver could alternatively be incorporated in an electromagnetic induction loop. As a further alternative, the transmitter and receiver could operate on the basis of infrared transmission.

What is claimed is:

1. A system for non-audibly alerting a telephone user when the telephone is being energized by ringing voltage, the system comprising (i) a telephone unit for coupling to the telephone line, the telephone unit including a sensing means for sensing successive ringing voltage bursts and a transmitter adapted to emit a signal burst in response to each successive ringing voltage burst, and (ii) a user unit including a receiver for receiving the signal bursts from the transmitter and a transducer under the control of the receiver for converting the received signal into a non-audibly sensible signal.

2. A system as claimed in claim 1, in which the transmitter is a radio transmitter and the receiver is a radio receiver.

3. A system as claimed in claim 1, in which the sensing means and the transmitter are coupled through an optical isolator.

4. A system as claimed in claim 3, further including a mains power transformer for applying DC power to the transmitter.

5. A system as claimed in claim 1, in which the transmitter includes a timing network controlling the transmitter whereby to emit radio frequency bursts corresponding in length to ringing voltage bursts.

6. A system as claimed in claim 1, in which the receiver and the transducer are battery driven.

7. A system as claimed in claim 1, in which the transducer includes an electric motor having an eccentric mounted on an output shaft thereof.

8. A system as claimed in claim 7, in which the motor, in operation, vibrates against a wall of a housing therefor.

9. A system as claimed in claim 8, in which the housing is combined with a harness for mounting the housing on a telephone user's wrist.

10. A system as claimed in claim 9, the receiver unit including a second housing spaced from the first housing and also combined with the harness, the second housing containing the receiver, an interconnecting web between the housings supporting electrical interconnect means extending between the transducer and the receiver.

11. A system as claimed in claim 1, the receiver having a threshold detection circuit controlling a VMOS low power switch for switching current from a battery power source to the transducer.

* * * * *